United States Patent
Ikeda

(10) Patent No.: US 9,222,391 B2
(45) Date of Patent: Dec. 29, 2015

(54) EXHAUST GAS PURIFICATION SYSTEM

(71) Applicant: DENSO CORPORATION, Kariya, Aichi-pref. (JP)

(72) Inventor: Sumitaka Ikeda, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/503,785

(22) Filed: Oct. 1, 2014

(65) Prior Publication Data

US 2015/0089926 A1   Apr. 2, 2015

(30) Foreign Application Priority Data

Oct. 2, 2013   (JP) .................................. 2013-207637

(51) Int. Cl.
 F01N 3/00 (2006.01)
 F01N 3/20 (2006.01)
 F01N 11/00 (2006.01)
 F01N 13/00 (2010.01)
 F01N 3/10 (2006.01)
 F01N 3/035 (2006.01)

(52) U.S. Cl.
CPC .............. *F01N 3/208* (2013.01); *F01N 3/2046* (2013.01); *F01N 3/2066* (2013.01); *F01N 11/002* (2013.01); *F01N 13/008* (2013.01); F01N 3/035 (2013.01); F01N 3/106 (2013.01); F01N 2430/00 (2013.01); F01N 2550/05 (2013.01); F01N 2560/026 (2013.01); F01N 2560/06 (2013.01); F01N 2560/08 (2013.01); F01N 2610/02 (2013.01); F01N 2610/10 (2013.01); F01N 2610/146 (2013.01); F01N 2610/148 (2013.01); F01N 2900/1808 (2013.01); F01N 2900/1811 (2013.01); F01N 2900/1821 (2013.01)

(58) Field of Classification Search
 USPC ........... 60/276, 277, 286, 295, 297, 298, 301, 60/303, 320
 See application file for complete search history.

(56) References Cited

U.S. PATENT DOCUMENTS 6,279,603 B1   8/2001   Czarnik et al.
7,614,213 B2 *  11/2009  Hirata ..................... F01N 3/208
                                                          60/277

(Continued)

FOREIGN PATENT DOCUMENTS

JP         09-96212      4/1997
JP         2005-214100   8/2005

(Continued)

OTHER PUBLICATIONS

Office Action (1 page) dated Oct. 20, 2015, issued in corresponding Japanese Application No. 2013-207637 and English translation (2 pages).

*Primary Examiner* — Binh Q Tran
(74) *Attorney, Agent, or Firm* — Nixon & Vanderhye PC

(57) ABSTRACT

An exhaust gas purification system for an internal combustion engine includes: an addition valve disposed in an exhaust pipe of the internal combustion engine to add a reducing agent to exhaust gas; a temperature obtaining portion that acquires a temperature of the addition valve; a cooling portion that cools the addition valve by circulating cooling fluid; a determining portion that determines whether the cooling portion is able to normally cool the addition valve; and an output limit portion that limits output of the internal combustion engine based on a heat-resistant temperature of the addition valve and the temperature of the addition valve acquired by the temperature obtaining portion.

6 Claims, 5 Drawing Sheets

(56) References Cited

U.S. PATENT DOCUMENTS

| | | | | |
|---|---|---|---|---|
| 7,805,930 | B2 * | 10/2010 | Satou | B01D 53/9431 60/286 |
| 7,849,674 | B2 * | 12/2010 | Masuda | B01D 53/9409 60/286 |
| 8,281,570 | B2 * | 10/2012 | Gierszewski | F01N 3/2066 60/274 |
| 9,021,787 | B2 * | 5/2015 | Yan | F01N 11/00 60/276 |
| 2002/0001554 | A1 | 1/2002 | Czarnik et al. | |
| 2005/0235632 | A1 | 10/2005 | Tarabulski et al. | |
| 2008/0087739 | A1 | 4/2008 | Tarabulski et al. | |
| 2009/0179087 | A1 | 7/2009 | Martin et al. | |
| 2010/0242439 | A1 | 9/2010 | Domon et al. | |
| 2013/0118155 | A1 | 5/2013 | Domon et al. | |
| 2013/0283769 | A1 * | 10/2013 | Watanabe | F01N 3/208 60/274 |

FOREIGN PATENT DOCUMENTS

| | | |
|---|---|---|
| JP | 2008-169711 | 7/2008 |
| JP | 2010-96126 | 4/2010 |

* cited by examiner

EXHAUST GAS PURIFICATION SYSTEM

CROSS REFERENCE TO RELATED APPLICATION

This application is based on Japanese Patent Application No. 2013-207637 filed on Oct. 2, 2013, the disclosure of which is incorporated herein by reference in its entirety.

TECHNICAL FIELD

The present disclosure relates to an exhaust gas purification system.

BACKGROUND

The present disclosure relates to an exhaust gas purification system that cleans exhaust gas by adding a reducing agent into an exhaust pipe of an internal combustion engine.

In recent years, urea selective catalytic reduction (SCR) system is developed for an internal combustion engine such as diesel engine applied to a vehicle as an exhaust gas purification system that chemically reduces nitrogen oxide (NOx) in exhaust gas with a high purification rate.

The urea SCR is equipped with a pump, a discharge piping and an addition valve. The pump pumps urea water (urea solution) stored in a tank as a reducing agent. The discharge piping is connected to the discharge side of the pump. The addition valve adds the urea water pumped through the discharge piping into an exhaust pipe of the engine.

In case where the urea water is added into the exhaust pipe from the addition valve, the urea water and exhaust gas are supplied to a SCR catalyst, and the exhaust gas is purified by the reduction reaction of NOx on the SCR catalyst. In the reduction reaction of NOx, urea water is hydrolyzed by exhaust heat into ammonia ($NH_3$), and the ammonia is added to NOx contained in the exhaust gas selectively adsorbed to the SCR catalyst. Then, NOx is reduced and purified by the reduction reaction based on ammonia on the SCR catalyst.

In the case where the urea water is added into the exhaust pipe using the addition valve, the temperature of the addition valve is raised by high-temperature exhaust gas. Therefore, a cooling device is provided for radiating heat of the addition valve to avoid too much raising in the temperature of the addition valve. For example, JP 2012-509439A (US 2005/0235632 A1, US 2008/0087739 A1, US 2009/0179087 A1) describes a cooling device which radiates heat of an addition valve by circulating urea liquid as cooling fluid between the addition valve and a pump.

However, if the cooling fluid is frozen, it becomes impossible to circulate the cooling fluid to cool the addition valve properly while the engine is operated. In this case, the temperature of the addition valve may rise exceeding heat-resistant temperature. Under the circumstance, if an output of the engine is limited to reduce heat of exhaust gas, it is difficult to obtain sufficient torque.

SUMMARY

It is an object of the present disclosure to provide an exhaust gas purification system for an internal combustion engine, in which a temperature of an addition valve is restricted from too much raised while the internal combustion engine is operated.

According to an aspect of the present application, an exhaust gas purification system for an internal combustion engine includes an addition valve, a temperature obtaining portion, a cooling portion, a determining portion and an output limit portion. The addition valve is disposed in an exhaust pipe of the internal combustion engine, and adds a reducing agent to exhaust gas flowing through the exhaust pipe. The temperature obtaining portion acquires a temperature of the addition valve. The cooling portion cools the addition valve by circulating cooling fluid. The determining portion determines whether the cooling portion is able to normally cool the addition valve. The output limit portion limits output of the internal combustion engine based on a heat-resistant temperature of the addition valve and the temperature of the addition valve acquired by the temperature obtaining portion so that the temperature of the addition valve becomes lower than or equal to the heat-resistant temperature, when the determining portion determines that the cooling portion is not able to normally cool the addition valve while the internal combustion engine is operated.

Accordingly, the engine power is restricted so that the temperature of the addition valve becomes below the heat-resistant temperature, based on the heat-resistant temperature of the addition valve and the temperature of the addition valve acquired by the temperature obtaining portion, when the addition valve cannot properly perform a cooling operation. Under the present circumstance, the engine power is limited based on not only the heat-resistant temperature of the addition valve but also the actual temperature of the addition valve. Therefore, the engine power can be limited only by a proper (minimum) quantity, based on the difference between the actual temperature and the heat-resistant temperature of the addition valve. Thus, if an abnormality is generated in the circulation of cooling fluid, the addition valve can be restricted from being thermally damaged by limiting the engine power without inconvenience.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An exhaust gas purification system according to an embodiment is explained referring to drawings. The exhaust gas purification system cleans exhaust gas by chemically reducing NOx using a selection reduction type catalyst. The selection reduction type catalyst is hereafter referred to SCR catalyst. The exhaust gas purification system is configured as a urea SCR system.

The exhaust gas purification system is described with reference to FIG. 1. The exhaust gas purification system cleans exhaust gas discharged from an internal combustion engine 10 such as diesel engine mounted to a vehicle (not shown). The exhaust gas purification system has various actuators, various sensors, and an ECU (electronic control unit) 40. The exhaust gas purification system of this embodiment is applicable to various cars having a diesel engine, construction machinery such as a crane truck and agricultural machinery such as a tractor.

Figure 1:
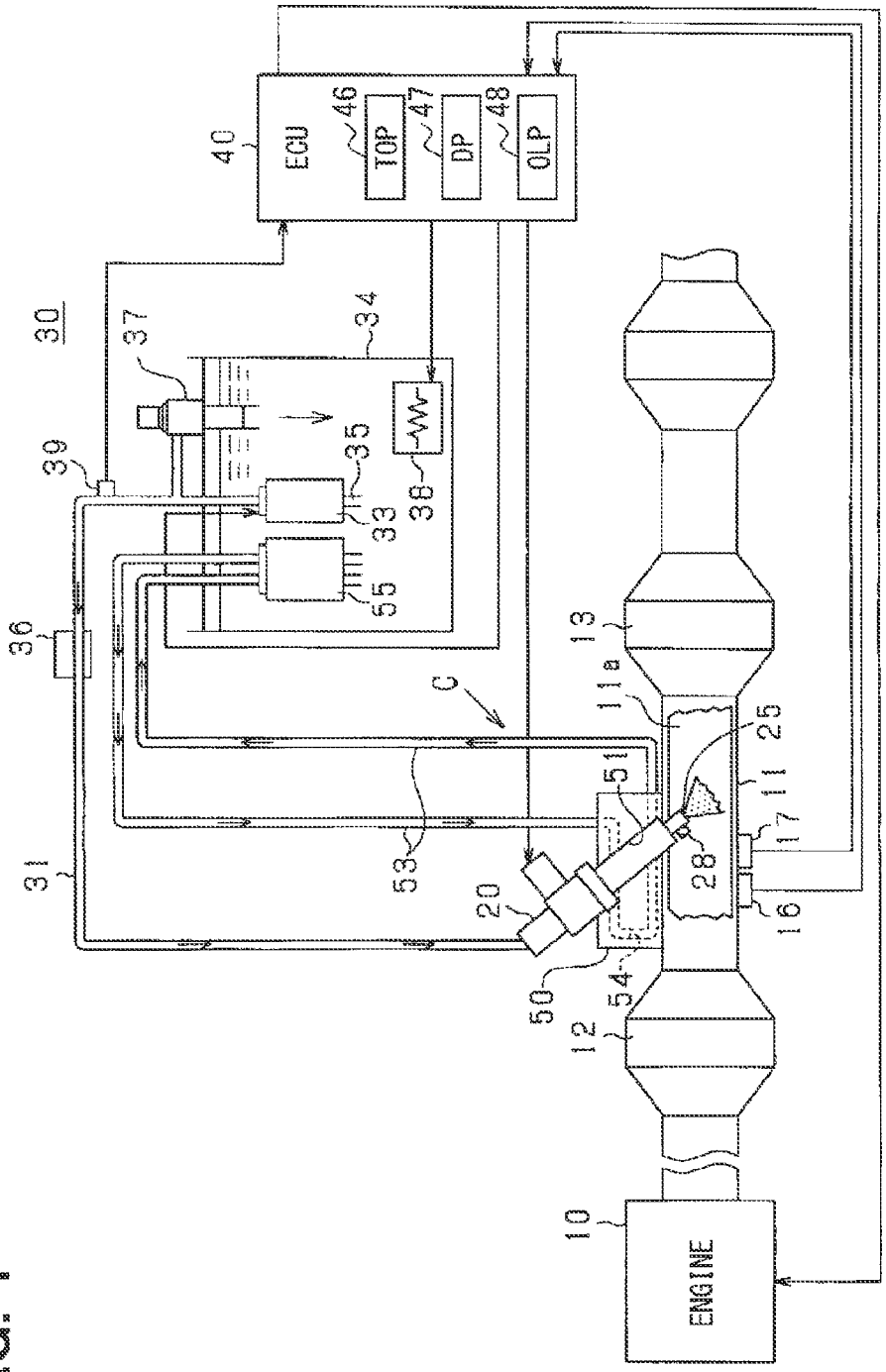
FIG. 1 is a schematic diagram illustrating an exhaust gas purification system, according to an embodiment, for an internal combustion engine.

In an engine exhaust system of FIG. 1, an exhaust pipe 11 is connected to the internal combustion engine 10, and defines an exhaust passage 11a in the exhaust pipe 11. A diesel particulate filter (DPF) 12 and a SCR catalyst 13 are arranged in the exhaust pipe 11 in this order from the upstream side. An addition valve 20 is disposed between the DPF 12 and the SCR catalyst 13 in the exhaust pipe 11. The addition valve 20 adds and supplies urea water (urea solution) to the exhaust passage 11a as a reducing agent solution. The addition valve 20 is placed such that only the tip side portion of the addition valve 20 is positioned in the exhaust pipe 11. Thus, the addition valve 20 can be made less affected by heat of exhaust gas having high temperature such as 600° C.

A NOx sensor 16 and an exhaust gas temperature sensor 17 are disposed to the exhaust pipe 11. The NOx sensor 16 detects the amount (concentration) of NOx in exhaust gas flowing through the exhaust passage 11a, and a purification rate of NOx purified by the SCR catalyst 13 may be obtained using the detection value of the NOx sensor 16. The exhaust gas temperature sensor 17 detects the temperature of the exhaust gas flowing through the exhaust passage 11a.

An oxidation catalyst (not shown) may be disposed downstream of the SCR catalyst 13 in the exhaust pipe 11, as an ammonia removing equipment. Excessive ammonia ($NH_3$) discharged from the SCR catalyst 13 is removed by the oxidation catalyst.

Details of the exhaust gas purification system are explained.

The DPF 12 includes a filter for removing particulate matter (PM) from exhaust gas by catching the PM. Platinum-based oxidation catalyst is supported on the filter of the DPF 12 so as to remove HC and CO with soluble organic fraction (SOF) which is a component of the PM. The PM collected by the DPF 12 can be removed by combustion, for example, by post injection after a main fuel injection in the diesel engine. The removal by combustion corresponds to a reproduction process. Therefore, it is possible to continuously use the DPF 12.

The SCR catalyst 13 facilitates the reduction reaction of NOx (exhaust gas purification reaction) with the following chemical equations.

$$4NO+4NH_3+O_2 \rightarrow 4N_2+6H_2O \quad \text{(equation 1)}$$

$$6NO_2+8NH_3 \rightarrow 7N_2+12H_2O \quad \text{(equation 2)}$$

$$NO+NO_2+2NH_3 \rightarrow 2N_2+3H_2O \quad \text{(equation 3)}$$

In these reactions, the addition valve 20 disposed upstream of the SCR catalyst 13 adds and supplies ammonia ($NH_3$) as a reducing agent of NOx.

Figure 2:
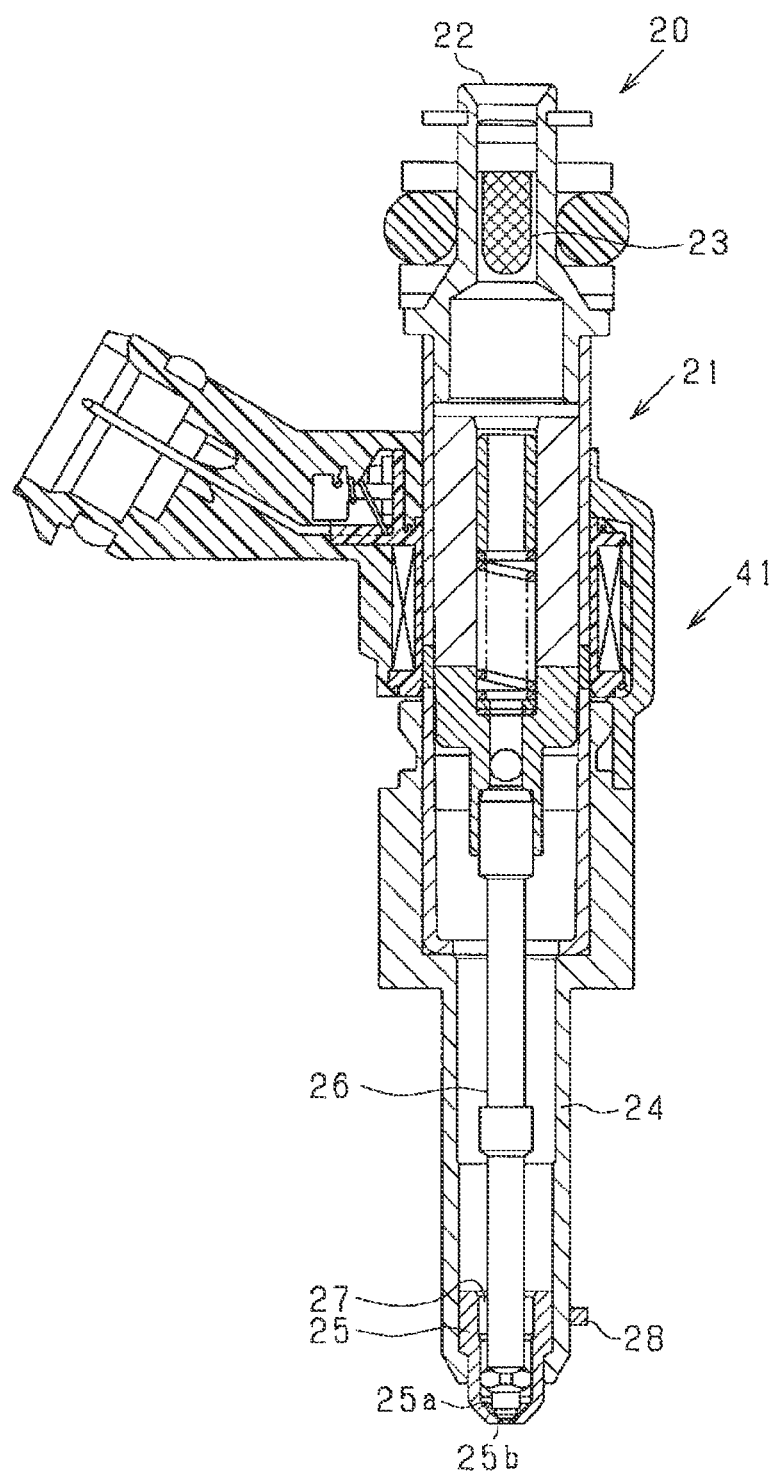
FIG. 2 is a schematic cross-sectional view illustrating an addition valve of the exhaust gas purification system.

As shown in FIG. 2, the addition valve 20 has a housing 21, a filter 23, a nozzle holder 24, a nozzle body 25, a needle 26, a temperature sensor 28 and an actuator 41. The housing 21 has a first feed port 22 from which urea water flows into the housing 21 at the upper part (on the upstream side). The urea water which flows from the first feed port 22 flows into the inner circumference side of the housing 21 via the filter 23.

The nozzle holder 24 having a cylindrical shape is arranged on the other end (downstream side) of the housing 21. The nozzle body 25 having a cylindrical shape is accommodated in the nozzle holder 24. The nozzle body 25 has a conic inner wall surface in which the inside diameter becomes smaller as approaching the tip end, and a valve seat 25a is defined on the inner wall surface. Moreover, the end surface of the nozzle body 25 has plural injection holes 25b from which urea water is added. The urea water supplied to the first feed port 22 flows in order of the housing 21, the nozzle holder 24, and the nozzle body 25, and is injected from the injection hole 25b into the exhaust passage 11a.

The needle 26 (valve object) is accommodated in an accommodation chamber defined inside of the housing 21, the nozzle holder 24, and the nozzle body 25. The needle 26 is able to reciprocate in the axial direction. The needle 26 is approximately coaxially arranged as the nozzle body 25. An annular passage 27 is defined between the outer circumference surface of the needle 26 and the inner circumference surface of the nozzle body 25, and urea water flows through the annular passage 27.

The needle 26 is driven by the actuator 41. When the addition of urea water is stopped, the actuator 41 is moved in the axial direction to force the needle 26 to be pressed on the valve seat 25a, such that the injection hole 25b is closed. When urea water is added, the actuator 41 drives the needle 26 to separate from the valve seat 25a in the axial direction, and the annular passage 27 is opened. Thereby, the addition of urea water is switched between execution (ON) and stop (OFF).

The temperature sensor 28 is arranged to the radially outer side of the tip end portion (nozzle body 25) of the addition valve 20. The temperature sensor 28 may be made of thereto sensitive resistor (thermistor) having heat resistance property relative to the heat-resistant temperature of the addition valve 20. The heat-resistant temperature (especially heat-resistant temperature at the tip end side) of the addition valve 20 is, for example, 300° C.

Next, a urea water feed unit 30 which supplies urea water to the addition valve 20 is explained with reference to FIG. 1. The urea water feed unit 30 includes a urea water tank 34 from which urea water is supplied to the addition valve 20. In this meaning, the urea water tank 34 is located on the upstream side, and the addition valve 20 is located on the downstream side.

In FIG. 1, the urea water tank 34 consists of a gastight container with a liquid-supply cap, and urea water having a predetermined concentration such as 32.5% is stored in the tank 34. In this embodiment, the freeze temperature (coagulating point) is set the lowest by setting the urea concentration at 32.5%. In this case, urea freezes at a temperature lower than or equal to minus 11° C. (−11° C.).

The urea water tank 34 and the addition valve 20 are connected with each other through a urea water feed pipe 31. A urea water passage (reducing agent passage) is formed in the urea water feed pipe 31. The urea water feed pipe 31 has a urea water suction opening 35 for sucking urea water at the tip end adjacent to the urea water tank 34. The urea water suction opening 35 is immersed in urea water in the state where the urea water is stored in the urea water tank 34.

A urea water pump 33 is disposed in the urea water feed pipe 31. The urea water pump 33 is an electric in-line-type pump rotated with a drive signal output from the ECU 40.

In this embodiment, the urea water pump 33 can be rotated in both directions. When the urea water pump 33 is rotated in a normal direction, urea water is sucked from the urea water tank 34. When the urea water pump 33 is rotated in a reverse direction, urea water is drawn back to the urea water tank 34.

A filter equipment 36 is arranged in the urea water feed pipe 31 for filtering urea water on the upstream side (adjacent to the urea water tank 34). Moreover, a pressure control valve 37 and a pressure sensor 39 are arranged in the urea water feed pipe 31. The pressure control valve 37 controls the pressure of urea water. The pressure sensor 39 detects the discharge pressure of urea water discharged with the urea water pump 33. It is determined whether the circulation of urea water is to be performed or not based on the pressure detection result of the pressure sensor 39.

When the urea water is pumped toward the addition valve 20, the urea water pump 33 rotates in the normal direction by being energized. Thereby, the urea water is pumped from the urea water tank 34, and flows through the filter equipment 36 to the downstream side. At this time, a foreign substance contained in the urea water can be removed with the filter equipment 36. The discharge pressure of the urea water pumped by the urea water pump 33 is controlled to have a predetermined supply pressure by the pressure control valve 37, and is supplied to the addition valve 20. Moreover, extra urea water as a result of the pressure control is returned to the urea water tank 34.

When the urea water is returned back to the urea water tank 34, the urea water pump 33 rotates in the reverse direction. Thereby, the urea water in the urea water feed pipe 31 is returned into the urea water tank 34, such that the urea water feed pipe 31 is restricted from being damaged by freezing or expansion of urea water that may be caused in case the urea water remains in the urea water feed pipe 31 while the vehicle is parked after engine stop.

A heating element 38 is disposed in the urea water tank 34. For example, the heating element 38 may be an electric heater, and thaws the urea frozen in the urea water tank 34 by being energized in response to a command signal output from the ECU 40. The heating element 38 is located at a position where the frozen urea can be defrosted, and may be positioned near the suction port of the urea water feed pipe 31.

In the system, while the engine is operated, the urea water in the urea water tank 34 is pumped to the addition valve 20 through the urea water feed pipe 31 by the urea water pump 33, and the urea water is supplied into the exhaust pipe 11 by the addition valve 20. Then, in the exhaust pipe 11, urea water is supplied to the SCR catalyst 13 with exhaust gas, and the exhaust gas is purified by the reduction reaction of NOx such as the following equation 4 in the SCR catalyst 13.

(NH$_2$)2CO+H$_2$O→2NH$_3$+CO$_2$ (equation 4)

In other words, the urea water is hydrolyzed under high temperature condition caused by the exhaust heat. Thus, ammonia (NH$_3$) is generated and the ammonia is adsorbed to the SCR catalyst 13. Further, in the SCR catalyst 13, NOx contained in exhaust gas is selectively reduced and removed by the ammonia. That is, on the SCR catalyst 13, NOx is reduced and purified by the reduction reaction (above-mentioned equations 1-3) based on ammonia.

Moreover, the addition valve 20 of this embodiment is configured to be cooled with the urea water of the urea water tank 34. A cooling device C for cooling the addition valve 20 is disposed in the urea water feed unit 30. The cooling device C is explained using FIG. 1. The cooling device C includes a heat radiating block 50, a cooling piping 53, and a second pump 55.

The heat radiating block 50 has an accommodation part 51 which accommodates the addition valve 20, and a urea water cycle passage 54 for circulating cooling fluid inside the heat radiating block 50. The cooling piping 53 and the urea water cycle passage 54 form a circulation passage for urea water between the heat passage block 50 and the addition valve 20.

When the second pump 55 of the cooling device C is energized in response to a drive signal output from the ECU 40, the urea water pumped from an end of the cooling piping 53 is supplied toward the heat radiating block 50. The urea water which flowed into the heat radiating block 50 receives the heat of the addition valve 20 by heat exchange, and flows through downstream of the cooling piping 53 to be returned to the urea water tank 34. The addition valve 20 is cooled by the circulation of urea water.

In case where the addition valve 20 cannot be properly cooled during the operation of the engine 10, abnormalities may be caused if the temperature of the addition valve 20 rises and exceeds the heat-resistant temperature. For example, in case where a vehicle having the exhaust gas purification system is used in a cold district, if the outside air temperature is very low (for example, less than minus 10° C.) when the engine 10 is started, the urea water in the urea water tank 34 is frozen. In this case, it becomes impossible to cool the addition valve 20 by the circulation of urea water. Also when the urea water feed unit 30 has abnormalities such as failure in the urea water pump 33, it becomes impossible to cool the addition valve 20 by the circulation of urea water.

If the addition valve 20 cannot be cooled due to abnormalities in the circulation of urea water, the amount of heat emitted from exhaust gas may be reduced by restricting the output of the engine 10 in a manner that temperature raising in the addition valve 20 is suppressed.

However, when the output of the engine 10 is restricted, it leads to cause inconvenience, for example, sufficient torque cannot be obtained. For example, when the engine power is restricted in the case of construction machinery, there is a possibility that working efficiency may become worse.

According to the present embodiment, in case where an abnormality is generated in the circulation of urea water during the operation of the engine 10, if the temperature of the addition valve 20 may exceed the heat-resistant temperature, the engine power is restricted in order to suppress the temperature raising in the addition valve 20. In this case, the output of the engine 10 is limited by a feedback control controlling the engine power based on a difference between an actual temperature and the heat-resistant temperature of the addition valve 20. Thus, the inconvenience caused by the restriction in the engine power can be suppressed while the addition valve 20 is prevented from thermally damaged.

Figure 3:
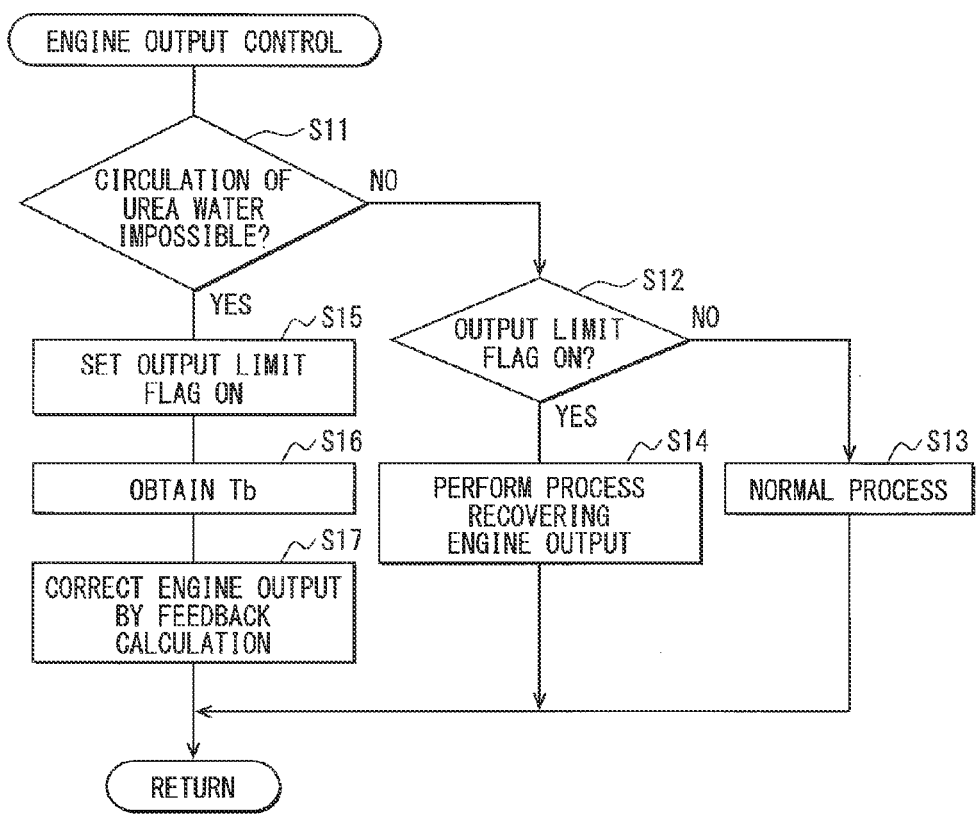
FIG. 3 is a flow chart illustrating a process of limiting an output of the internal combustion engine.

A flow chart of the engine output control process is shown in FIG. 3. This process is repeatedly performed by the ECU 40 with a predetermined time cycle.

At S11, it is determined whether the circulation of urea water is possible or not possible by a determining portion (DP) 47 of the ECU 40. In other words, it is determined whether it is possible to normally cool the addition valve 20. The determination whether the circulation of urea water is possible or not is performed based on the pressure (pump pressure) detected by the pressure sensor 39. When the pressure detected with the pressure sensor 39 is more than or equal to a predetermined value, the circulation of urea water is possible, and it progresses to S12.

At S12, it is determined whether an output limit flag is ON. When the output limit flag is not ON, it progresses to S13, and the output of the engine 10 is not limited in a normal process. At this time, a decrease correction of the engine output based on an addition valve temperature Tb is not carried out.

When the pressure detected with the pressure sensor 39 is less than the predetermined value, it is determined that the circulation of urea water is impossible in S11, and it progresses to S15. The output limit flag of the engine 10 is set ON at S15.

At S16, the addition valve temperature Tb (the temperature Tb of the addition valve 20) is acquired from the temperature sensor 28 by a temperature obtaining portion (TOP) 46 of the ECU 40. At S17, the output of the engine 10 is corrected to decrease by a feedback correction amount by an output limit portion (OLP) 48 of the ECU 40.

For example, in case where the engine power is controlled by controlling the fuel injection amount, the correction amount (limit amount) of the fuel injection amount is computed based on the difference between the addition valve temperature Tb (actual value detected by the sensor) and a target temperature Ttg (for example, 200° C.) of the addition valve 20 preset in advance based on the heat-resistant temperature LM (300° C.) of the addition valve 20.

More specifically, the feedback correction amount is computed based on a deviation $\Delta T$ (=Ttg−Tb) between the addition valve temperature Tb and the target temperature Ttg of the addition valve 20, using PID control technique. At this time, the feedback correction amount is computed by adding a proportionality correction clause, an integration correction clause, and a differentiation correction clause. The proportionality correction clause and the integration correction clause are computed based on the deviation $\Delta T$. The differentiation correction clause is computed based on a variation amount in the deviation $\Delta T$.

The basic injection quantity is computed based on an engine speed and an engine load such as accelerator opening. A final fuel injection amount is calculated by adding the feedback correction amount to the basic injection quantity. At a time of calculating the fuel injection amount, air/fuel ratio correction, warm-up correction and the like are suitably performed, but explanation thereof is omitted here.

Figure 4:
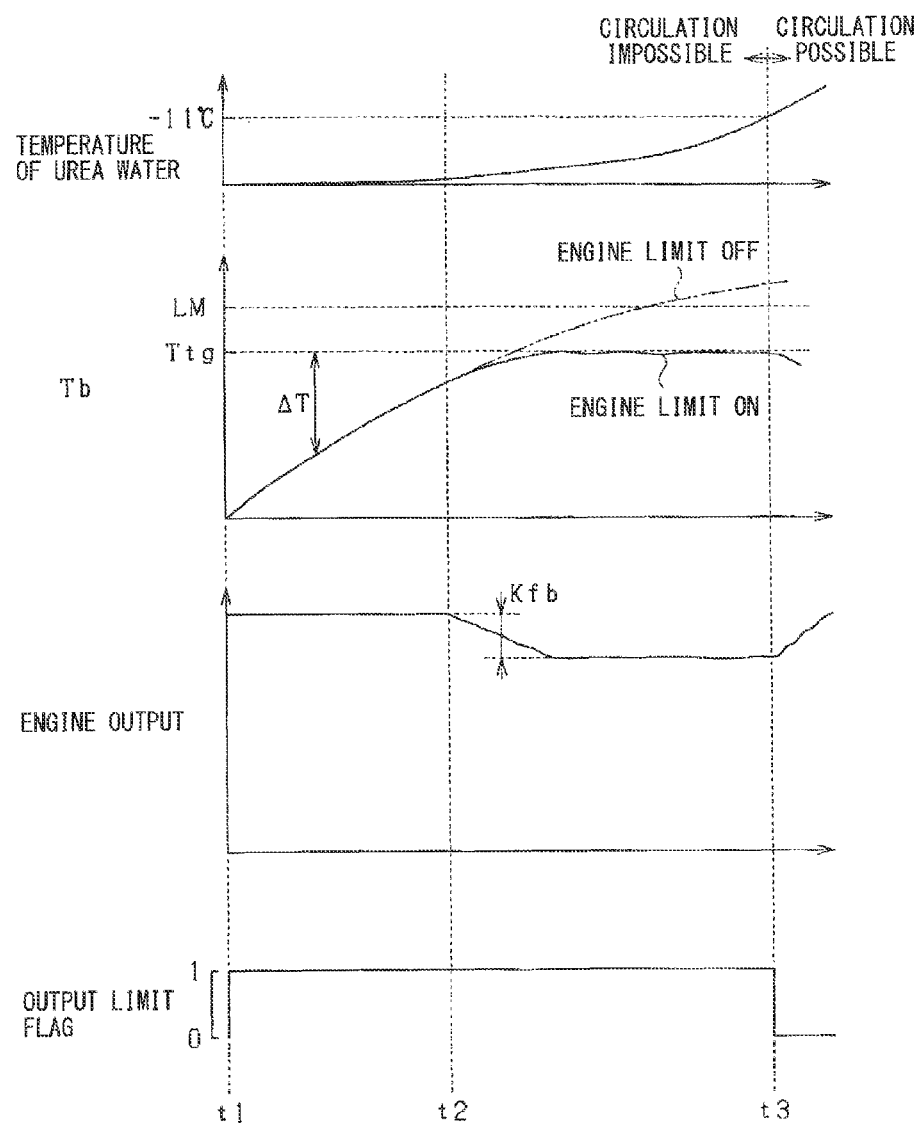
FIG. 4 is a timing chart illustrating a process of limiting an output of the internal combustion engine.

As shown in FIG. 4, the target temperature Ttg is set on the low temperature side only by a predetermined value from the heat-resistant temperature LM. To calculate the correction amount of the fuel injection amount based on the difference between the target temperature Ttg and the addition valve temperature Tb is approximately equal to calculate the correction amount of the fuel injection amount based on the heat-resistant temperature LM and the addition valve temperature Tb.

The gain of proportional control is set in a manner that the proportionality correction clause becomes larger as the addition valve temperature Tb approaches to the target temperature Ttg (i.e., decreasing rate becomes larger as the deviation $\Delta T$ becomes smaller).

The gain of integral control is set in a manner that the integration correction clause becomes larger (decreasing rate becomes larger) as the integrated value of deviation $\Delta T$ is smaller in a predetermined integration period from the present moment to past.

The gain of differentiation control is set in a manner that the differentiation correction clause becomes larger (decreasing rate becomes larger) as a variation amount (present value− previous value| in the deviation $\Delta T$ is larger. The variation amount in the deviation $\Delta T$ is an absolute value between a this-time value and a last-time value.

At this time, the differentiation correction clause is computed according to the increasing speed in the addition valve temperature Tb. The differentiation correction clause is made larger as the increasing speed is larger. Each of the gains is suitably set based on a model of the cooling device C.

When the output limit flag is ON at 812, the circulation of urea liquid is Changed from impossible to possible. In this case, it progresses to S14, and performs a process recovering the output of the engine 10. In the recovering process of the engine 10 the feedback correction amount immediately before the recovering process is gradually decreased toward a normal output (fuel injection amount).

An execution example of the engine output control process is shown in FIG. 4, in which the engine is started in the state where the urea liquid is frozen in case a vehicle having the exhaust gas purification system is used in a cold district, with the assumption that the cooling device C is working normally. Under the circumstance, when the pressure detected with the pressure sensor 39 is less than the predetermined value, it is determined that the circulation of urea water is impossible, and the supply operation of urea liquid by the cooling device C is stopped. The cooling device C is repeatedly driven with a predetermined cycle in the state where the supply operation of urea liquid is suspended. When the detection value of the pressure acquired at this time is determined to be larger than or equal to the predetermined value, it is determined that the circulation of urea water is possible, and the supply operation of urea liquid is restarted to circulate urea water to the addition valve 20.

At a time t1, an ignition key (not shown) is set to ON to start the engine 10, and the obtaining of the addition valve temperature Tb is started. Moreover, the pressure of the urea water pump 33 is detected with the pressure sensor 39. Because urea water is frozen at the time t1, the pressure detected by the pressure sensor 39 is less than the predetermined value, so the supply operation of urea water by the cooling device C is stopped.

At the time t1, since the circulation of urea water is impossible, the output limit flag of the engine 10 is set ON. After the time t1, the feedback correction amount Kfb is calculated based on the deviation $\Delta T$ between the target temperature Ttg of the addition valve 20 and the addition valve temperature Tb. The output of the engine is limited based on the feedback correction amount Kfb, such that the fuel injection amount is corrected to decrease.

However, at the time t1 and immediately after the time t1, the deviation $\Delta T$ is comparatively large. Under this state, the feedback correction amount Kfb is zero. In other words, each of the proportionality correction clause, the integration correction clause, and the differentiation correction clause is zero. Therefore, the engine power is substantially not limited, so the fuel injection amount is not decreased. After the time t1, since the engine is driven, the temperature of exhaust gas discharged into the exhaust passage 11a rises, and the addition valve temperature Tb rises gradually with the heat of exhaust gas.

Then, at a time t2, the addition valve temperature Tb approaches the target temperature Ttg, namely, the deviation $\Delta T$ becomes comparatively small. The feedback correction amount Kfb is calculated so as to be actually used for decreasing (|Kfb|>0). Thereby, after the time t2, the engine power is limited, so the fuel injection amount is decreased. Compared with a case where the engine power is not limited (see the single chain line in FIG. 4), the increasing rate in the addition valve temperature Tb is decreased (see the solid line in FIG. 4). Thereafter, when the addition valve temperature Tb reaches the target temperature Ttg while the increasing rate in the addition valve temperature Tb is decreased, the feedback correction amount Kfb is calculated in a manner that the addition valve temperature Tb becomes equal to the target temperature Ttg.

At a time t3, when the temperature of urea water rises to a predetermined temperature (−11° C.), urea water is thawed, so the circulation of urea water becomes possible. The output limit flag of the engine 10 is set to OFF, and the urea water pump 33 is set to ON. Under the circumstance, while the feedback correction amount Kfb decreases gradually, the fuel injection amount is returned to a normal output. After the time t3, the addition valve 20 is cooled by circulation of urea water, and the addition valve temperature Tb starts to decrease.

After the time t3 (not illustrated in FIG. 4), if abnormalities arise in the cooling device C while the engine 10 is normally controlled, when the detection value of pressure detected by the pressure sensor 39 becomes more than or equal to the predetermined value, i.e., when it becomes impossible to circulate urea liquid, the output limit flag of the engine 10 is set to ON, and the output of the engine 10 is limited. Thereby, the addition valve 20 is protected from thermal affection.

Advantages of the embodiment will be described.

In case where the addition valve 20 cannot be properly cooled during the operation of the engine 10, if the addition valve temperature Tb rises and exceeds the heat-resistant temperature LM, the addition valve 20 may be damaged. Under the present circumstance, in order to suppress the rise in temperature of the addition valve 20, it is possible to limit the output of the engine 10 to reduce the exhaust heat. However, restricting the output of the engine 10 may lead to inconvenience such that it becomes impossible to obtain sufficient torque.

According to the embodiment, when the addition valve 20 cannot be properly cooled during the operation of the engine 10, the output of the engine 10 is restricted based on the target temperature Ttg and the addition valve temperature Tb, so that the addition valve temperature Tb is lower than or equal to the target temperature Ttg. The inconvenience caused by the restriction in the engine power can be eliminated while the addition valve 20 can be restricted from thermal damage that is generated when the addition valve temperature Tb exceeds the heat-resistant temperature LM.

When the temperature increasing speed of the addition valve 20 is large, the addition valve temperature Tb reaches the target temperature Ttg (or the heat-resistant temperature LM) comparatively early. In contrast, when the temperature increasing speed of the addition valve 20 is slow, it takes comparatively long time for the addition valve temperature Tb to reach the target temperature Ttg (or the heat-resistant temperature LM).

When the temperature increasing speed of the addition valve 20 is large (quick) the feedback correction amount Kfb is set comparatively large. When the temperature increasing speed of the addition valve 20 is small (slow), the feedback correction amount Kfb is set comparatively small. Thus, the inconvenience caused by the restriction in the engine power can be eliminated while the addition valve 20 can be restricted from thermal damage that is generated when the addition valve temperature Tb exceeds the heat-resistant temperature LM.

The feedback control of engine power is conducted so that the addition valve temperature Tb and the target temperature Ttg may become equal with each other. Therefore, while the engine power can be limited, the disadvantage produced by limiting the engine power can be more suitably reduced.

The embodiment may be modified as follows without being limited to the above description.

In the embodiment, the target temperature Ttg is set on the low temperature side lower than the heat-resistant temperature LM by a predetermined amount, in the feedback control for limiting the engine power. Alternatively, the heat-resistant temperature LM may be set as the target temperature Ttg.

It is determined whether the cooling of the addition valve 20 by circulation of urea water is possible or impossible based on the discharge side pressure of the pump in the embodiment. Alternatively, the temperature of urea water in the urea water tank 34 may be detected with a temperature sensor, and the determination may be performed based on the temperature of urea water. For example, if the temperature of urea water is lower than or equal to −11° C. which is the melting point of urea water, the cooling of the addition valve 20 is supposed impossible. If the temperature of urea water is higher than −11° C., the cooling of the addition valve 20 will be enabled.

The engine output is limited by the feedback control using the PID control technique in the above embodiment. Alternatively, the engine power may be limited by a feedback control using, for example, a PD control technique. Moreover, the engine power may be limited without using the feedback control technique.

Figure 5:
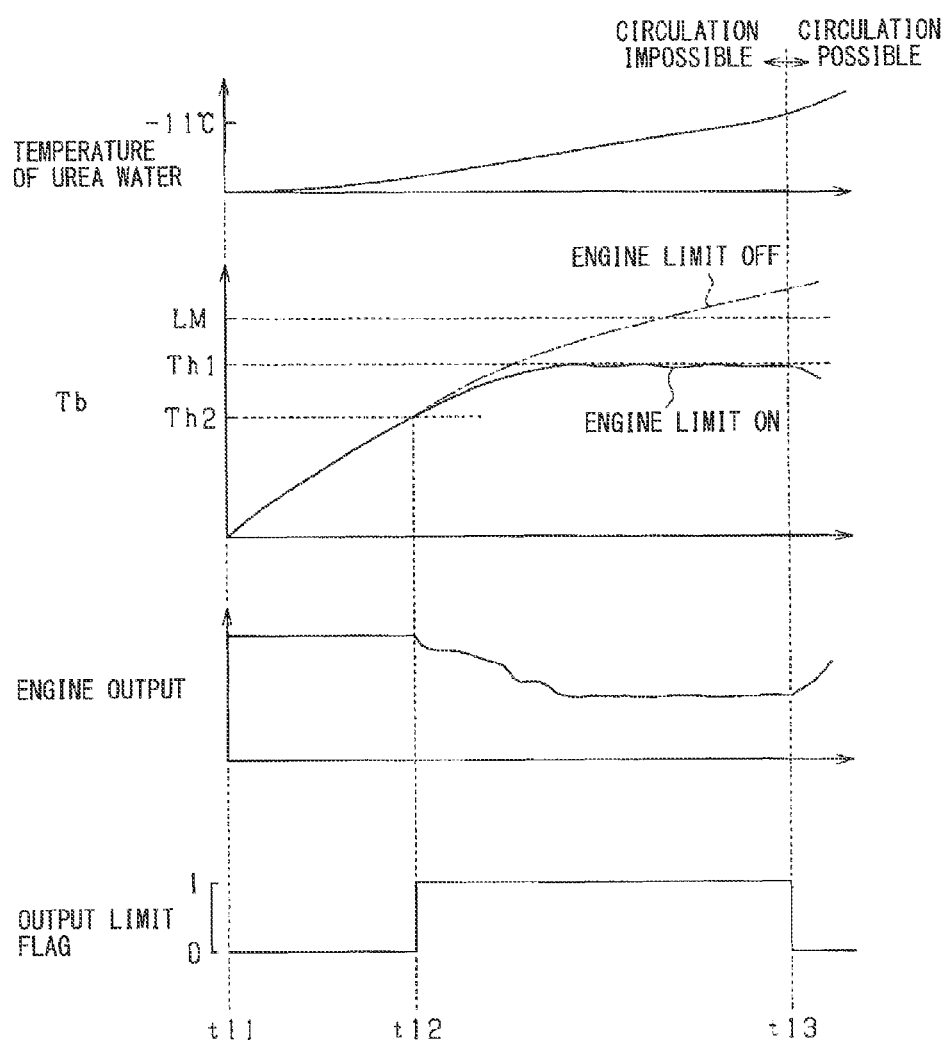
FIG. 5 is another timing chart illustrating a process of limiting an output of the internal combustion engine.

In FIG. 5 which shows another example of timing chart, the engine 10 starts at a time t11 and the addition valve temperature Tb reaches a predetermined temperature Th2 which is a lower limit temperature at a time t12. At the time t12, an output limit flag is set ON and the output limit of the engine 10 is started. In this case, the addition valve temperature Tb can be restricted to less than a target temperature Th1 which is an upper limit temperature.

At a time t13, when the urea water temperature Ta rises up to a predetermined temperature (−11° C.), the output limit flag is set OFF and the output limit of the engine 10 is ended. In FIG. 5, the threshold for performing the output limit of the engine 10 is defined at two levels Th1 and Th2. The number of threshold levels may be one or three or more without limited to two.

When the output limit flag of the engine 10 is set ON, the temperature of exhaust gas may be lowered by increasing the amount of exhaust gas recirculation (EGR). Thus, the temperature of the addition valve 20 can be restricted from increasing.

The addition valve temperature Tb may be presumed from the temperature of exhaust gas detected by the exhaust gas temperature sensor 17, and the output limit of the engine 10 may be determined to conduct or not based on the presumed addition valve temperature Tb. In this case, a relationship between the temperature of the exhaust gas detected by the exhaust gas temperature sensor 17 and the addition valve temperature Tb is acquired in advance, and is memorized beforehand in a memory (not shown).

The ECU 40 executes the output limit of the engine 10, when the addition valve temperature Tb presumed from the detected temperature of exhaust gas reaches the upper limit temperature (for example, target temperature Ttg). Thus, the addition valve temperature Tb can be restricted from exceeding the predetermined value. The addition valve temperature Tb can be acquired with easier composition, without adding a component for exclusive use for detecting the temperature of the addition valve 20, in case where the addition valve temperature Tb is estimated based on the exhaust temperature detected by the sensor 17. Furthermore, the addition valve temperature Tb may be estimated based on the drive state of the engine 10, other than using the sensor 17.

The addition valve 20 may add ammonia-origin compounds other than urea water.

The addition valve 20 may be cooled using well-known liquid such as water other than urea liquid. Under the circumstance, in case when the cooling of the addition valve 20 is not performed properly by circulation of the liquid corresponding to a cooling fluid during the operation of the engine 10, the output of the engine 10 is limited such that the addition valve 20 can be avoided from thermally affected.

A circulation passage may be formed in the body of the addition valve 20 for circulating cooling fluid, and the addition valve 20 may be cooled by circulating cooling fluid in the circulation passage.

In case where the addition valve 20 is not properly cooled by the circulation of urea water during the operation of the engine 10, if the outside air temperature detected with an outside air temperature sensor is higher than a melting point of urea water, it can be determined that there is an abnormality in the urea water feed unit 30 such as the urea water pump 33.

In this case, a cause of the failure in the circulation of urea water can be specified more accurately.

Such changes and modifications are to be understood as being within the scope of the present disclosure as defined by the appended claims.

What is claimed is:

1. An exhaust gas purification system for an internal combustion engine comprising:
    an addition valve disposed in an exhaust pipe of the internal combustion engine, the addition valve adding a reducing agent to exhaust gas flowing through the exhaust pipe;
    a temperature obtaining portion that acquires a temperature of the addition valve;
    a cooling portion that cools the addition valve by circulating a cooling fluid; and an electronic control unit comprising:
    a determining portion that determines whether the cooling portion is able to normally cool the addition valve; and
    an output limit portion that limits output of the internal combustion engine based on a heat-resistant temperature of the addition valve and the temperature of the addition valve acquired by the temperature obtaining portion so that the temperature of the addition valve becomes lower than or equal to the heat-resistant temperature, when the determining portion determines that the cooling portion is not able to normally cool the addition valve while the internal combustion engine is operated.

2. The exhaust gas purification system according to claim 1, wherein
    the output limit portion limits the output of the internal combustion engine based on a raising speed in the temperature of the addition valve.

3. The exhaust gas purification system according to claim 1, wherein
    the output limit portion sets a target temperature of the addition valve, and limits the output of the internal combustion engine so that the temperature of the addition valve becomes equal to the target temperature of the addition valve.

4. The exhaust gas purification system according to claim 1, wherein
    the addition valve has a tip end portion exposed in the exhaust pipe to add the reducing agent in the exhaust pipe, and
    the temperature obtaining portion acquires a temperature of the tip end portion as the temperature of the addition valve.

5. The exhaust gas purification system according to claim 1, further comprising:
    an exhaust gas temperature sensor that detects a temperature of the exhaust gas, wherein
    the temperature obtaining portion presumes the temperature of the addition valve based on the temperature of the exhaust gas detected by the exhaust gas temperature sensor.

6. The exhaust gas purification system according to claim 1, wherein
    the cooling portion includes
        a pump pumping the reducing agent that is stored in a tank, and
        a piping connected to a discharge side of the pump, and
    the cooling portion cools the addition valve by circulating the reducing agent pumped through the piping as the cooling fluid between the tank and the addition valve.

* * * * *